C. J. SCHWARZE.
COMMUTATOR.
APPLICATION FILED MAR. 28, 1916.
1,229,149.
Patented June 5, 1917.
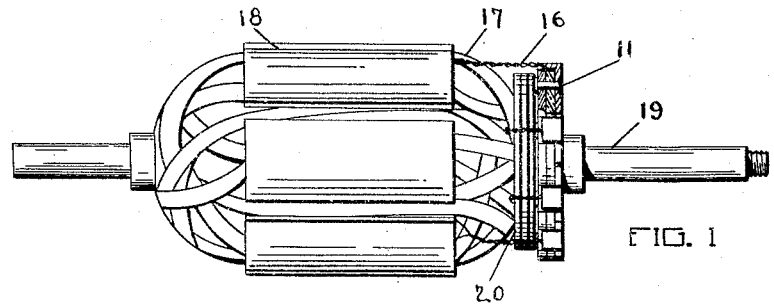
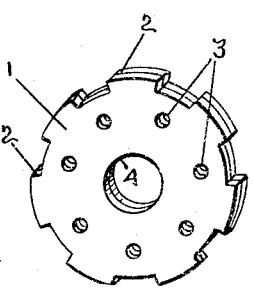
FIG. 2
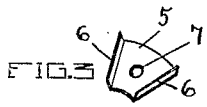
FIG. 3
FIG. 4
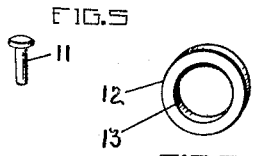
FIG. 5  FIG. 6
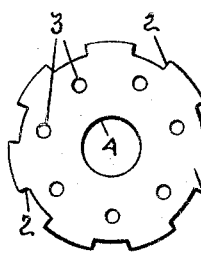
FIG. 7
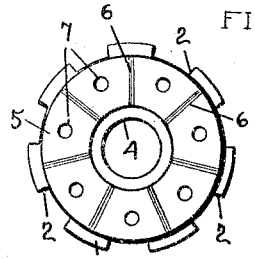
FIG. 8
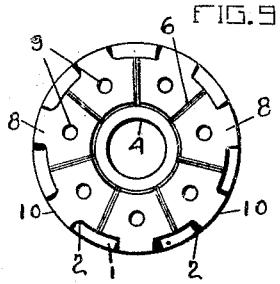
FIG. 9
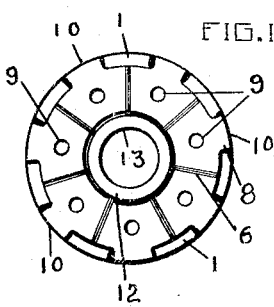
FIG. 10
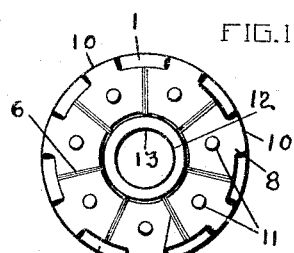
FIG. 11
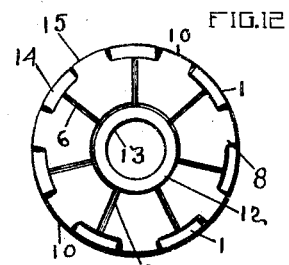
FIG. 12
Inventor
Carl J Schwarze
By Geo E Kirk
Attorney

UNITED STATES PATENT OFFICE.

CARL J. SCHWARZE, OF ADRIAN, MICHIGAN, ASSIGNOR TO SCHWARZE ELECTRIC COMPANY, OF ADRIAN, MICHIGAN, A CORPORATION OF MICHIGAN.

COMMUTATOR.

1,229,149.  Specification of Letters Patent.  Patented June 5, 1917.

Application filed March 28, 1916. Serial No. 87,188.

*To all whom it may concern:*

Be it known that I, CARL J. SCHWARZE, a citizen of the United States of America, residing at Adrian, Lenawee county, Michigan, have invented a new and useful Commutator, of which the following is a specification.

This invention relates to the grouping of relatively insulated terminals.

This invention has utility when incorporated in commutators of the radial face type.

Referring to the drawings:

Figure 1 is a side elevation with parts broken away of an embodiment of the invention in a radial face commutator;

Fig. 2 is a perspective view of a plurality disk insulation ring base for the commutator;

Fig. 3 is a perspective view of a radially flanged segmental insulation seat;

Fig. 4 is a perspective view of a segmental conducting terminal;

Fig. 5 is a perspective view of an anchoring pin;

Fig. 6 is a perspective view of a central insulation ring;

Fig. 7 is a face view of the peripherally notched insulation disk;

Fig. 8 is a view of the insulation disk with the insulation seats grouped thereon;

Fig. 9 is a view of the peripherally notched insulation disks with the segmental insulation seats thereon and the segmental terminals disposed in the seats;

Fig. 10 is a view of the elements of Fig. 9 with the central insulation ring added;

Fig. 11 is a view of the elements of Fig. 10 with the anchoring pins added; and

Fig. 12 is a view of the elements of Fig. 11 with the anchoring pins riveted and the face of the commutator surfaced and all in readiness for anchoring to a coil and the mounting upon an armature.

In the production of this commutator which may have special adaptability in small motor operations say in low voltage for signaling as in diaphragm horns, the elements may be cheaply produced by cutting or forming for assembly. In the instance herewith the base insulation ring 1 may be cut with a die from sheet stock and whether or not a plurality of elements are used depends on the break-down conditions and usage to which it is to be subjected. In the instance shown a thin stock is cut and the rings 1 are used in duplicate.

The ring 1 has the peripheral series of notches 2 and the annular series of openings 3 disposed about the central opening 4 of the base ring 1. A lighter stock insulation may be used for the insulation segments 5 which have the flanges 6 at the segment terminals. In the annular grouping, these insulation segments seat to have the openings 7, of the segments 5 register with the openings 3 in the base 1. The flanges 6 radially extend to embrace the radially extending sides of the terminal segments 8, which may also be stamped from sheet metal. These segments 8 are provided with openings 9 disposed to register with the openings 3, 7, in the endless annular series grouping of the terminals and insulation seats upon the insulation base or ring.

The terminal 8 has its outer extremity forked axially extending to provide the portion 10 seating snugly in the notches 2 of the base 1 when the parts are assembled for anchoring by the pin 11 after the ring 12 has been centrally disposed in the series of segments to have its opening 13 register with the opening 4 of the base 1. So assembled, axial pressure is applied, riveting the pins 11 on the face side of the terminals 8 and all may then be surfaced to produce the complete commutator 14 of Fig. 12 with each segment 15 effectively anchored by the pins 11 and insulated from each other by the flanges 6 of the insulation seats, while the base ring 1 and the central insulation ring 12 afford a firm insulation support for the terminals.

The axial extensions 10 of the terminals may have soldered or effectively anchored thereto the leads 16 to the armature coils 17 of the armature 18 mounted on the armature shaft 19. In mounting the face commutator upon the commutator shaft 19, insulation rings 20 may be disposed on the shaft 19 between the coils 17 and the heads of the pins 11 thereby fully protecting the commutator against shorting or break-down in a structure which is of light weight, contains a minimum of material which is uniformly disposed in a structurally strong grouping to withstand considerable electrical abuse in a device of simple form possible for rapid and economical assembly.

What is claimed and it is desired to secure by Letters Patent is:

1. A radial face commutator embodying a peripherally notched insulation disk provided with an annular series of holes therethrough, a pin through each hole, radially flanged end insulation segments, and terminal segments on the pins circumferentially spaced by the insulation segment flanges and having axial extensions engaging the peripheral notches of the disk.

2. A commutator embodying an insulation base, terminals thereon, a headed pin through the base anchoring each terminal, and an insulation ring against the heads of the pins maintaining the pins in assembled position.

3. A commutator embodying an insulation base, a plurality of channel unit insulation seats, terminals, a pin through the base anchoring a terminal to a seat and the base, and an insulation ring parallel with the base and covering the pin.

4. A radial face commutator embodying an insulation base ring, a terminally flanged insulation segment, a terminal segment for the insulation segment, an assembling pin through the segment and ring, and an insulation ring parallel to the segment and concealing one end of the pin.

5. A commutator embodying an annular series of segmental terminals provided with axial extensions, insulation segment units each having a pair of diverging radial flanges, said units disposed in an annular series with the flanges abutting in pairs between the segmental terminals, and an insulation ring upon which the terminals and insulation segments are mounted.

6. A radial face commutator embodying a peripherally notched insulation disk, an annular series of terminals each provided with an axial extension disposed in a peripheral notch of the disk, and conductor leads connected to such extensions.

In witness whereof I affix my signature.

CARL J. SCHWARZE.